May 30, 1961     S. F. WILLIAMS     2,986,285
TRAVELING HOIST FOR ATTACHMENT TO TRUCKS
Filed Oct. 21, 1958     2 Sheets-Sheet 1
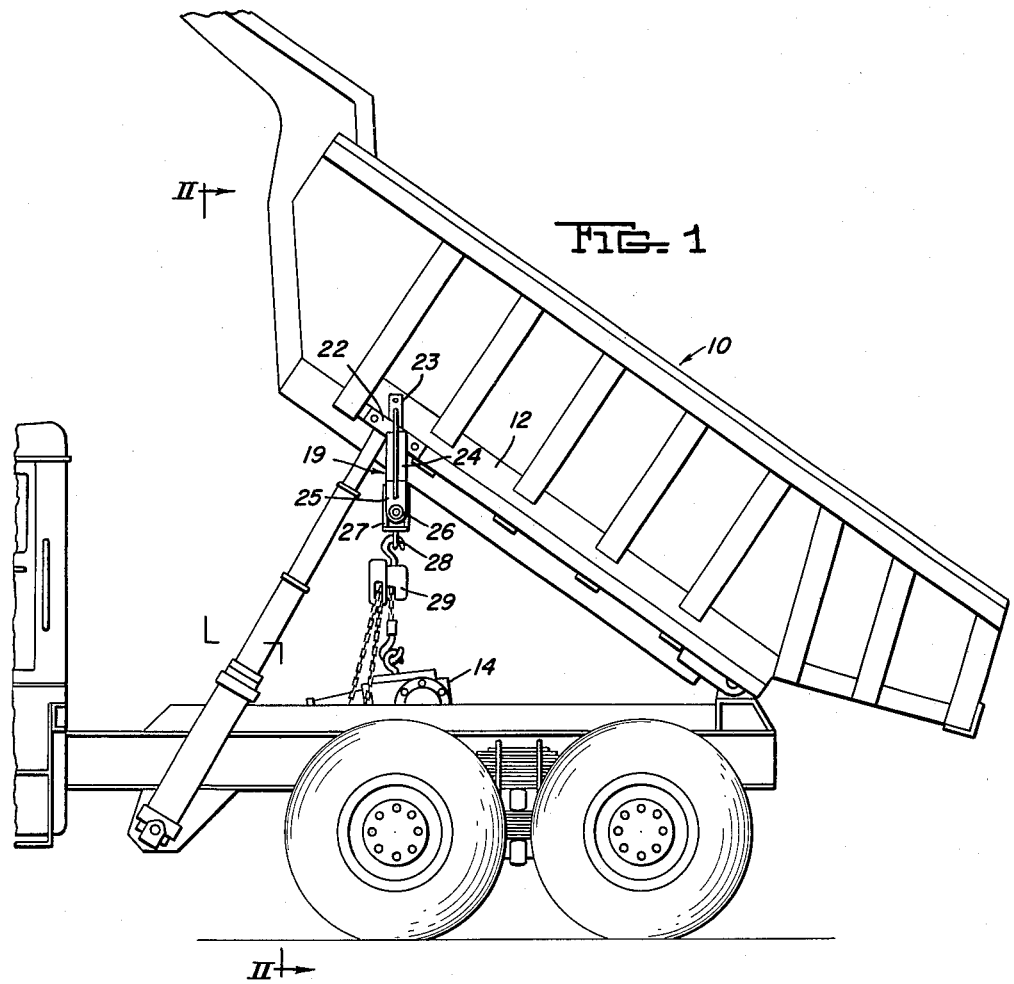
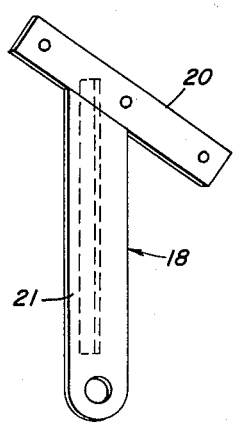
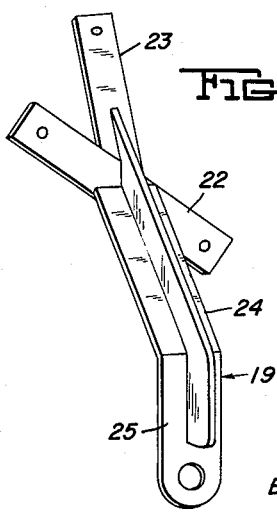
INVENTOR
SCOTT F. WILLIAMS
By Donald G. Dalton
Attorney May 30, 1961  S. F. WILLIAMS  2,986,285
TRAVELING HOIST FOR ATTACHMENT TO TRUCKS
Filed Oct. 21, 1958  2 Sheets-Sheet 2

INVENTOR
SCOTT F. WILLIAMS
By Donald G. Dalton
Attorney

United States Patent Office 2,986,285
Patented May 30, 1961

2,986,285
TRAVELING HOIST FOR ATTACHMENT TO TRUCKS

Scott F. Williams, Mountain Iron, Minn., assignor to United States Steel Corporation, a corporation of New Jersey Filed Oct. 21, 1958, Ser. No. 768,622

1 Claim. (Cl. 212—134)

This invention relates to an improved traveling hoist adapted to be mounted on a truck box for lifting the differential of the truck.

An object of the invention is to provide an improved traveling hoist adapted to be fixed to the underside of the box of a dump truck for lifting the differential and carrying it to a position clear of the truck wheels.

A more specific object is to provide a traveling hoist which includes brackets adapted to be fixed to opposite sides of a dump truck box, a monorail supported by the brackets, and a trolley carried by the monorail for lifting the differential of the truck and transporting it sideways beyond the truck wheels.

In accomplishing these and other objects of the invention, I have provided improved details of structure, a prefered form of which is shown in the accompanying drawings, in which:

Figure 1 is an elevational view of a portion of a truck with my traveling hoist installed thereon;

Figure 3 is a perspective view on a larger scale of one of the brackets used in my hoist; and Figure 4 is a perspective view on a larger scale of the other bracket.

Figure 2:
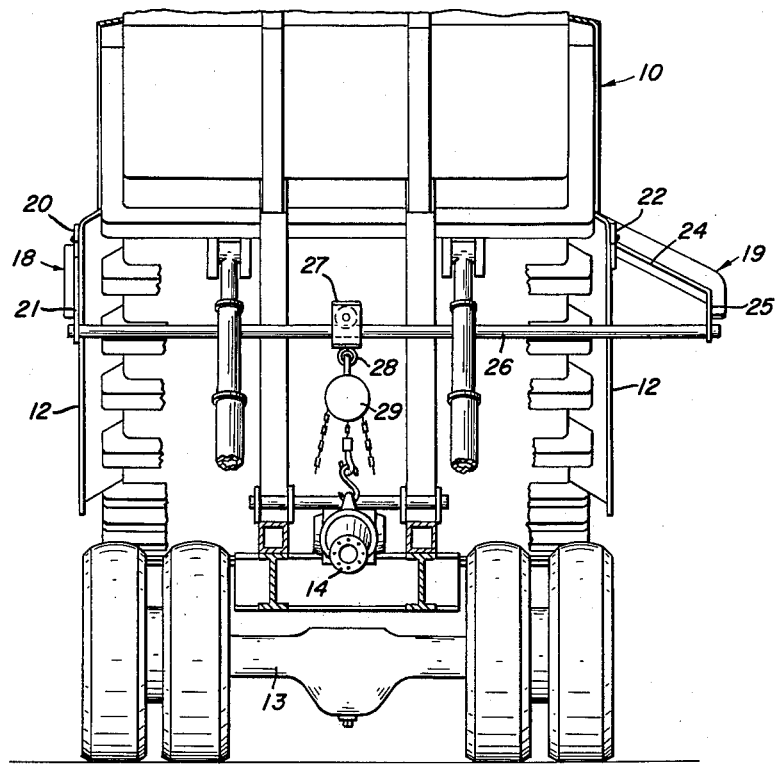
Figure 2 is a vertical sectional view on line II—II of Figure 1.

The drawings show a portion of a dump truck which has two sets of rear wheels in tandem. The truck includes a box 10, tire shields 12 extending along the lower edges of the box, a forward rear axle assembly 13, and a differential 14. When the truck box 10 is raised, its front end approximately overlies the forward rear axle assembly 13, as Figure 1 shows.

My traveling hoist includes a pair of brackets 18 and 19 adapted to be attached to the tire shields 12 on opposite sides of the truck box 10 near the front when the box is raised. As shown in Figure 3, bracket 18 is of approximately T-shape and has an integral crossbar 20 and depending leg 21. The crossbar is drilled to enable the bracket to be bolted to the tire shield on one side of the truck box. The angle between the leg and the crossbar is such that the leg is vertical when the bracket is attached to a raised truck box. As shown in Figure 4, bracket 19 has an integral crossbar 22, upward projection 23, lateral extension 24 and depending leg 25. Both the crossbar and upward projections are drilled to enable the bracket to be bolted to the tire shield on the other side. The lateral extension 24 is of sufficient length that leg 25 is located well outside the truck wheel, as Figure 2 shows. Again the angles are such that the leg is vertical when the bracket is attached to a raised truck box.

The legs 21 and 25 of the two brackets contain horizontally aligned openings through which a monorail 26 is inserted. A trolley 27 rides along this rail. The underside of the trolley carries an eyebolt 28 from which a conventional differential pulley mechanism 29 is suspended. The monorail 26 lies directly above the axle assembly 13, as Figure 1 shows. The trolley 27 can be moved to a position above the differential 14 in which the pulley mechanism 29 can lift the differential clear of the axle assembly. Thereafter the trolley is pushed sideways along the monorail toward bracket 19 until it is outside the tire. The differential then can be lowered to the floor. The reverse of these operations can be followed to replace the differential.

While I have shown and described only a single embodiment of my invention, it is apparent that modifications may arise. Therefore, I do not wish to be limited to the disclosure set forth but only by the scope of the appended claim.

I claim:

The combination, with a dump truck box, of a traveling hoist for lifting the differential of the truck and carrying it to a position outside the truck wheels comprising a pair of brackets detachably fixed to opposite sides of said box, each of said brackets having a leg which depends vertically when said box is raised, one of said brackets having a lateral extension extending outside the truck wheel and from which its leg depends, a monorail supported by said legs and extending therebetween transversely of said truck box, a trolley riding on said monorail, and a pulley mechanism suspended from said trolley and adapted to lift the differential, said trolley being adapted to carry the differential over the truck wheel to a position outside the truck wheel when moved along said monorail toward the bracket having the lateral extension.

References Cited in the file of this patent

UNITED STATES PATENTS

| | | |
|---|---|---|
| 1,952,238 | Dice | Mar. 27, 1934 |
| 2,198,414 | Panchuk | Apr. 23, 1940 |
| 2,505,003 | Perry | Apr. 25, 1950 |
| 2,522,267 | Hardin | Sept. 12, 1950 |
| 2,848,120 | Harmon | Aug. 19, 1958 |